United States Patent [19]

Shakra

[11] Patent Number: 4,566,317
[45] Date of Patent: Jan. 28, 1986

[54] BOREHOLE FLOW METER

[75] Inventor: Farid J. Shakra, Houston, Tex.

[73] Assignee: Schlumberger Technology Corporation, Houston, Tex.

[21] Appl. No.: 575,117

[22] Filed: Jan. 30, 1984

[51] Int. Cl.$^4$ .............................................. E21B 47/10
[52] U.S. Cl. .................................... 73/155; 73/861.03
[58] Field of Search ................ 73/155, 861.78, 861.79, 73/861.03

[56] References Cited

U.S. PATENT DOCUMENTS

| | | | |
|---|---|---|---|
| 3,002,384 | 10/1961 | MacDonald et al. | 73/861.78 |
| 3,162,042 | 12/1964 | Hart | 73/155 |
| 3,167,958 | 2/1965 | Hollmann | |
| 3,433,070 | 3/1969 | Grimaldi | |
| 4,088,022 | 5/1978 | Kalotay | 73/861.78 |
| 4,109,526 | 8/1978 | Rosso | 73/861.78 |
| 4,345,480 | 8/1982 | Basham et al. | 73/155 X |

OTHER PUBLICATIONS

Garlewsky, P. et al., A Guide to Inductive Proximity Switches, Instruments and Control Systems, Oct. '81, pp. 49-52.

Primary Examiner—Jerry W. Myracle

[57] ABSTRACT

Borehole fluid flow measuring apparatus is disclosed having a body member sized for passage through a wellbore. In a first embodiment of the invention, a thin metallic cross shaped disk is rotatably mounted in the body. Two solenoid coils are mounted in the body, their ends defining a plane facing the disk. The coils are each connected to separate oscillator circuits. Rotation of the disk in response to borehole fluid flow changes the amplitude of oscillation of each oscillator circuit because the impedance of each coil is changed when a metallic vane of the cross shaped disk is in line with the end of the coil. Because the disk is cross shaped, each revolution of the disk generates four pulses from separate demodulator - pulse shaping circuitry connected to the output of each oscillator circuit. One pulse train is selected as the reference train. The other pulse train leads or lags the reference train depending on the direction of rotation. Circuit means are provided for generating signals indicative of the speed of rotation of the disk and its direction. Speed of rotation of the disk is proportionally indicative of borehole fluid flow rate. Direction of rotation of the disk is indicative of fluid flow direction with respect to the body member. In a second embodiment of the invention, two light emitting diode/detector pairs are operably disposed opposite the plane of the vane presenting an optical path between the light emitting diode and the detector of a pair.

12 Claims, 12 Drawing Figures

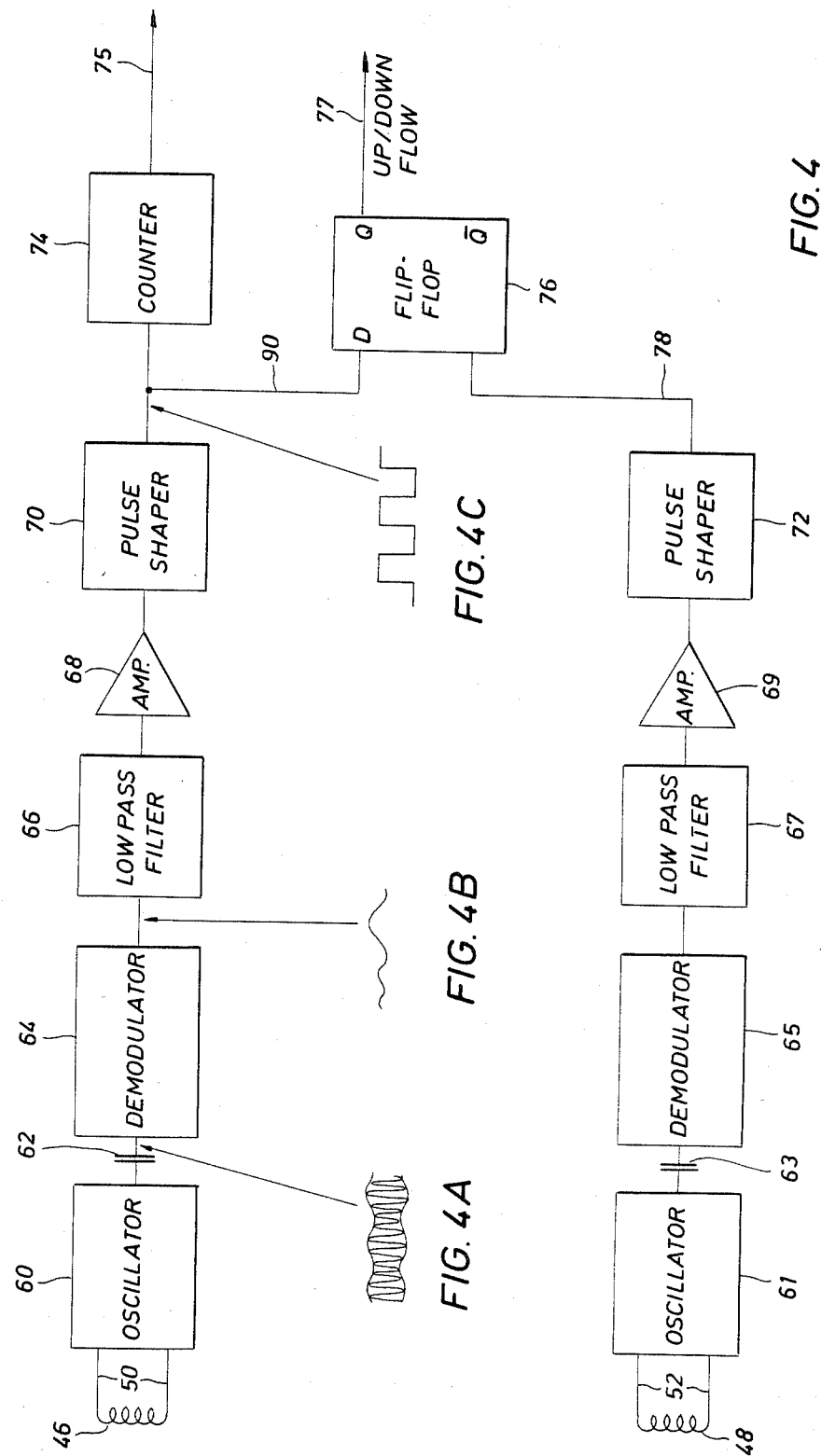

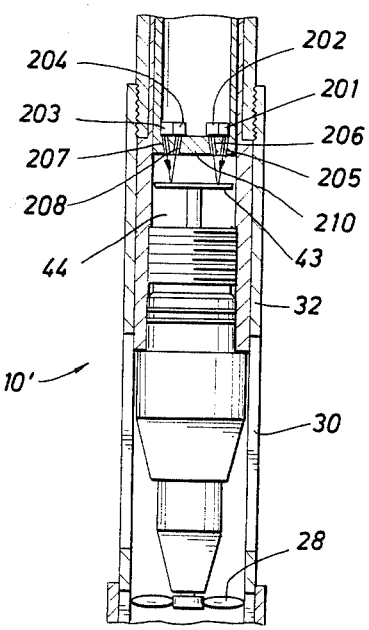
FIG. 7
FIG. 8
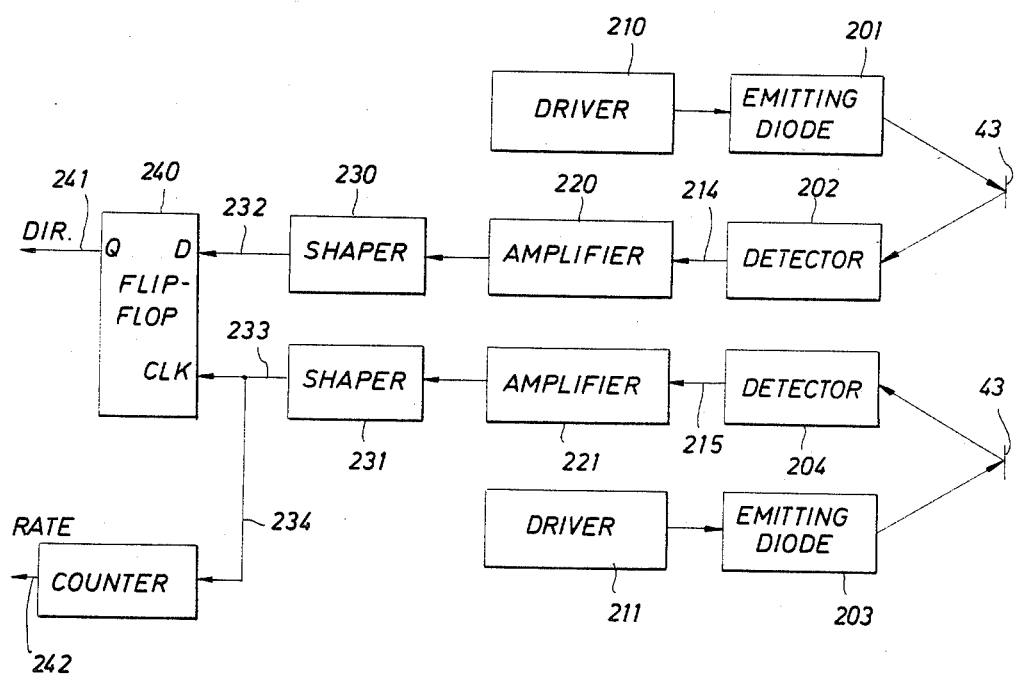

BOREHOLE FLOW METER

BACKGROUND OF THE INVENTION

1. Field of the Invention

This invention relates generally to borehole flow meters and particularly to borehole flow meters for measuring both the rate and direction of fluid flow.

2. Description of the Prior Art

Borehole flow meters have been used in the oil and gas industry for many years. One example of prior art flow meters is described in U.S. Pat. No. 3,630,078 issued in the name of Jean-Loup Bonnet. The flow meter described in that patent has a spinner blade or screw attached to a shaft mounted in a body member. Borehole fluid turns the spinner and the shaft to which it is attached. Permanent magnets disposed on the shaft actuate a reed relay disposed in the body adjacent the magnets. The turning on and off of the reed relay in response to the turning of the permanent magnets on the shaft serves to provide an indication of the flow rate of the fluid driving the spinner blade and consequently gives an indication of the fluid flow rate in the borehole.

While the borehole flow meter described in U.S. Pat. No. 3,630,078 has provided good measurements over the years for measuring borehole fluid flow rates, it has been found that providing permanent magnets on the shaft driven by the spinner is disadvantageous in at least two respects.

First, the permanent magnets attract magnetic particles which may be found in the borehole fluid. This is a problem regardless of the efficacy of sealing the shaft from borehole fluid. Such borehole fluid often is at high pressure and minute particles from the fluid may find their way through bearing and/or pressure sealing means to the space between the shaft and the body. Such particles may be attracted to the permanent magnets on the shaft and hinder the free and easy turning of the shaft.

A second problem has to do with the weight of the shaft caused by placing the permanent magnets on the shaft. Such weight adds to the inertia of the spinner/shaft system which negatively affects the responsiveness of the apparatus to changes in flow rates.

Another problem characteristic of all known borehole flow meters relates to their inherent inability to detect fluid flow rates in both directions. Borehole fluid may of course travel from the bottom of the hole upwardly for the case of a producing well where fluids are produced from a perforated zone and are flowing upwardly in the well. On the other hand, the fluid may be flowing from the top part of the well to the bottom part of the well for the case of an injection well where fluid is pumped from the top part of for injection via perforations in the bottom part of the hole.

Still another case where fluid flow may be in both directions is in a deviated borehole, so often found in offshore boreholes. In certain deviated boreholes even though the flow may be primarily in one direction from the bottom to the top of the hole, in certain locations in the hole, say in a lateral portion of it, the flow may be in both directions.

3. Identification of the Objects of the Invention

It is a primary object of the invention to provide a borehole apparatus for measuring the direction of the flow of borehole fluid.

It is another object of the invention to provide borehole fluid flow measuring apparatus which measures not only the direction of fluid flow, but also its speed or rate in either direction.

It is a still further object of the invention to provide borehole fluid flow measuring apparatus which because of its construction, is capable of measuring fluid flow rates at extremely low levels.

It is another object of the invention to provide an extremely light spinner shaft which has extremely low inertia and friction opposing rotation so as to enable it to measure extremely low flow rates.

SUMMARY OF THE INVENTION

The above identified objects as well as other advantages and features of the invention are provided in a borehole flow meter comprising a body member sized for passage through a wellbore and a vaned disc rotatably mounted in the body. The vanes of the disk are disposed in a disk plane perpendicular to the axis of the body member. Means are provided for turning the disk in proportion to the speed and direction of the borehole fluid. Sensing means disposed in the body are provided responsive to the turning of the vanes for generating a signal indicative of fluid flow rate.

Two embodiments are disclosed for the sensing means. The first provides solenoidal coils mounted such that their ends face the vaned disk across a gap. The coils, connected to separate oscillators, have their impedance changed by the vane turning across their ends. The change in impedance changes the output amplitude of the oscillators. The second embodiment provides light emitting diode/detector pairs mounted to face the disk and a reflective surface on the vanes of the disk. The turning of the vanes of the disk past each pair generates an alternating signal in detectors proportional to the rate of turning of the disk.

According to the first embodiment of the invention, two solenoidal coils are mounted in the body, the axis of the solenoid coils being parallel to the axis of the body member. The ends of the coils define a coil end plane which faces the disk plane across a gap. The ends of the coils are spaced less than one hundred eighty (180) degrees from each other. First and second oscillator means are connected respectively to the two solenoid coils, whereby the turning of a vane of the metallic disk pass the end of a coil causes the output of the respective oscillator means to vary in amplitude. Circuit means responsive to the output of the first and second oscillator means are provided for generating signals indicative of fluid flow rate and direction.

According to the invention, the means for turning the metallic vaned disk comprises a longitudinal shaft rotatably mounted in the body where the metallic vane is fastened at one end of the shaft and adjacent the solenoidal coils. An impeller is fastened at the other end of the shaft and means are provided for directing borehole fluid through the impeller in order to turn the impeller and the shaft and the vane in proportion to speed and direction of the fluid flow.

The directing means comprises a petal basket attached to the body means and extending longitudinally outwardly from the position of the impeller. Fluid enters the apparatus via the petal basket and is directed against the impeller. Slots extending longitudinally inwardly from the position of the impeller are opened to the body member providing ingress or egress of the fluid depending on the direction of the fluid. The impeller may be rotated in one direction by borehole fluid flowing from the petal basket against the impeller and out of the body via the slots and may be rotated in the opposite direction by borehole fluid flowing from the slots against the impeller and out of the body via the petal basket.

In a preferred construction of the first embodiment of the invention, the vaned metallic disk has four vanes each perpendicular to each other. The ends of the two solenoid coils preferably are spaced one hundred fifty-seven (157) degrees, (30) minutes from each other in an arc about the axis of the body member.

The circuit means comprises a first demodulator circuit means responsive to the output of a first oscillator means connected to one of the two solenoidal coils selected to be a reference coil. The first demodulator circuit generates a demodulated reference signal having amplitude variations with a frequency proportional to the rate of turning of the metallic vanes. First pulse forming means is provided responsive to the reference demodulated signal for generating a first pulse train signal having a frequency the same as that of the reference demodulated signal, the phase of the first pulse train signal being selected as a reference phase. Counter means are provided responsive to the first pulse train signal for generating an output signal indicative of the fluid flow rate.

A second demodulator circuit means responsive to the output of the second oscillator means is connected to the other of the two solenoidal coils. The second demodulator circuit means generates a second demodulated signal having an amplitude variation with a frequency proportional to the rate of turning of the metallic vanes. Second pulse forming means are provided responsive to the second demodulated signal for generating a second pulse train signal having a frequency the same as that of the rate of turning of the metallic vanes. With respect to the first pulse train signal however, the second pulse train signal has a phase lead of ninety (90) electrical degrees when the vanes are turning in one direction and a phase lag of ninety (90) electrical degrees when the vanes are turning in the opposite direction.

Logic circuit means are provided responsive to the first and second pulse train signals for generating a signal indicative of the direction of rotation of the vaned disk.

In the second embodiment of the invention, two light emitting diode/detector pairs are operably disposed opposite the plane of the vane presenting an optical path between the light emitting diode and the detector of a pair when the reflective surface of the vane is adjacent the end of a pair. A pair of circuit means is provided respectively to be responsive to each of the detectors to generate an alternating signal, the frequency of either of which is proportional to the rate of turning of the vane and the borehole fluid flow rate. With at least two vanes provided, logic circuit means responsive to said two alternating signals generates a signal indicative of the direction of fluid flow through the borehole.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown of which:

FIG. 4 including FIGS. 4A-4C, is a block diagram representation of the electrical circuit of the invention connected to the two solenoidal coils and illustrates schematically the generation of a fluid flow rate signal and a direction signal;

FIG. 7 illustrates the borehole fluid flow measuring apparatus according to the invention in which the sensing means are a pair of light emitting diode/detector pairs and associated circuit means; and FIG. 8 is a block diagram representation of the circuit means provided for generating direction and flow rate signals in response of the vaned disk alternatingly completing the transmission path from the diodes to the detectors.

DESCRIPTION OF THE INVENTION

Figure 1:
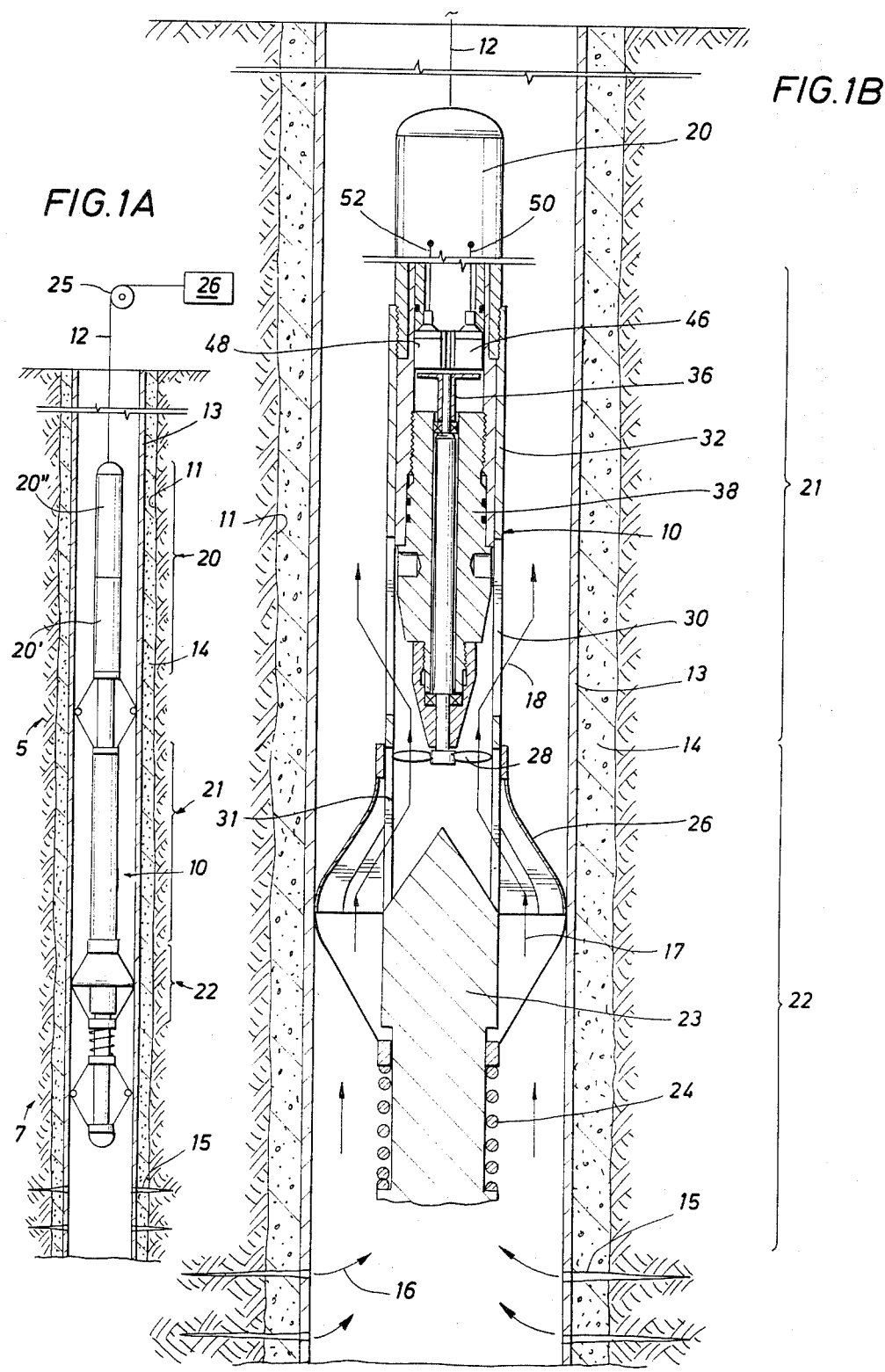
FIG. 1A and 1B are schematic representations of the borehole fluid flow measuring apparatus according to the invention in which the sensing means are a pair of solenoidal coils and associated circuit means the same being illustrated in the environment in which it is intended to be used, that is in a borehole attached to a wireline attached to surface equipment via a wireline.

FIGS. 1A and 1B illustrate a flow meter apparatus 10 suspended in a wellbore 11 by means of a cable 12, generally armored, and containing a single insulated conductor or multiple conductors if desired. The borehole 11 generally has at least a portion of its depth protected with a steel casing 13 held in place by cement 14. The casing 13 and the cement 14 may have perforations 15 through which flows fluid produced by the neighboring formation according to the direction of arrows 16.

The perforations 15 may serve as injection passages by which fluid may be injected into the formation via the well. Thus, flow may be in either direction caused either by upward fluid flow in response to a production well or by downward fluid flow in an injection well. Also, the fluid may be flowing in either direction in the well as is in the case of a deviated hole well wherein, say a lateral portion thereof, fluid may be flowing simultaneously in both directions at a particular location in the well.

FIG. 1A illustrates the flow meter apparatus of the invention in a preferred tool or sonde arrangement for logging a well. The flow meter tool has a flow sensor section 21 and upper electronics section 20' and hydraulic section 20". A petal basket section 22 is preferably disposed below the flow sensor section 21.

The sonde illustrated in FIG. 1A is heavy. Preferably a centralizer 5 is disposed between the electronics cartridge or section 20' and flow sensor section 21. Although the bow spring 26 of petal basket section 22 (FIG. 1B) may serve to centralize the lower part of the sonde in vertical boreholes, an additional certralizer 7 may be added below petal basket 22 for centralizing the lower part of the sonde in deviated wells.

FIG. 1B illustrates the flow section 21 and the petal basket section 22 in cross-section and in more detail than that shown in FIG. 1A. The upper electronics and hydraulic sections are shown generally as member 20 above flow sensor section 21. The petal basket section 22 is connected to the body member 32 of the flow sensor section by means of a mandrel 23 having entrance slots 31 disposed in its sides. A bow spring 26 is provided in the petal basket section 22 for centering the tool and for opening the petals which direct fluid flow against the impeller 28 mounted on a shaft 34 within the flow sensor section 21. An emergency retract spring 24 retracts the bow spring 26 and petals associated therewith if hydraulic control means (not illustrated) were to fail to control the operation of the bow spring 26.

Exit slots 30 provide an exit for fluid passing through impeller 28 as indicated by arrow 17 designating upward inward flow and arrow 18 designating upward exit flow. As mentioned above, the arrows may be turned in the opposite direction for the case where fluid is flowing from the top of the well to the bottom. In that case the arrow 18 would be turned around and would designate flow entering the apparatus from slot 30 and causing impeller 28 to rotate in an opposite direction and whereby such flow exits the apparatus via slots 31 in the mandrel 23 of the petal basket section 22.

Figure 2:
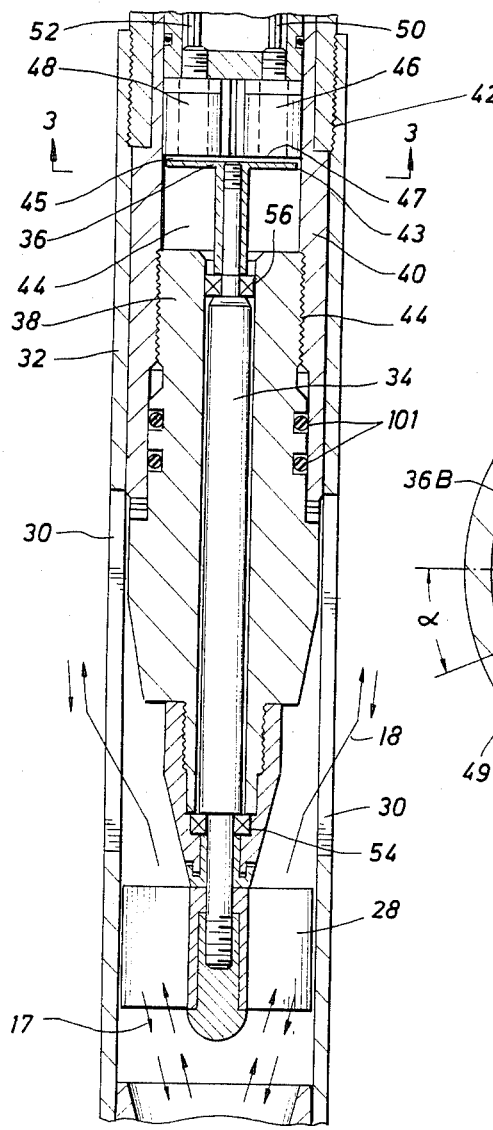
FIG. 2 illustrates an enlargement of that portion of the borehole apparatus of FIGS. 1A and 1B which generates signals representative of the direction and rate of flow of borehole fluid.

Both FIGS. 1B and 2 show the flow sensor section 21 of the borehole fluid flow measuring apparatus according to the invention. Shaft 34 is rotatably mounted within inner body member 38 by means of ball bearings 54 and 56 between shaft 34 and inner body member 38. Inner body member 38 is threadedly secured within sleeve 40 by means of threaded surfaces 44. Sleeve 40 is secured within the body member 32 by means of threaded surfaces 42.

An impeller 28 is connected to the end of shaft 34 toward the outward end of the flow sensor section 21. A vaned metallic disk 36 is provided on the inward end of shaft 34.

As illustrated in FIGS. 1B and 2, solenoidal coils 46 and 48 are mounted within the flow sensor section 21 and within sleeve 40 such that the axes of their coaxial coils are parallel to the axis of the sleeve and the body member 32. The coils are mounted such that their ends define a plane 47 which is parallel to the plane 43 of the disk 43 of disk 36. The plane 47 defined by the ends of the coils is separated by a gap 45 from the disk plane 43. Leads 50 and 52 extend from coils 46 and 48 to circuitry described below in FIGS. 4 and 5.

Referring again to FIG. 2, it is seen that fluid flow drives impeller 28 in either forward or backward direction in response to flow via below the probe or from above the probe. For example, arrows 17 below the probe are shown in two directions as well as arrows 18 designating flow from the exit slots 30. Of course when flow is from the outside to the interior of the tool against impeller 28, the flow enters the exit slots 30 and drives the impeller 28 in an opposite direction from the case where flow enters the entrance slots 31 as illustrated in FIG. 1B.

Figure 3:
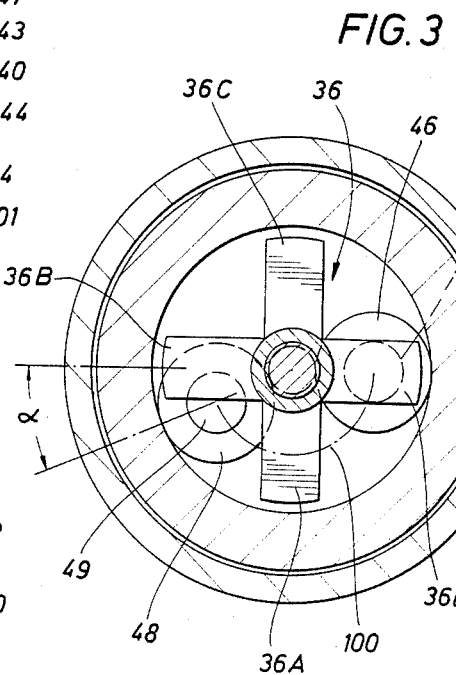
FIG. 3 illustrates in a cross-section taken along a plane defined by the vaned disk showing the disk and ends of solenoid coils mounted in the borehole measuring apparatus body.

Turning now to FIG. 3, a cross-section is taken through the disk 36 and illustrates partially in phantom the outline of coils 46 and 48. The disk 36 is preferably made of non-ferromagnetic metal and has four vanes 36A, 36B, 36C, 36D arranged perpendicular to one another in the shape of a cross. Coils 46 and 48 are solenoidal coils wound on cylindrical coil forms 47 and 49. The center line of the cylindrical coil 47 and cylindrical coil 48 are arranged in an arc 100 about the center line or axis of the body member 32. The center lines of coil form 47 and 49 are oriented less than one hundred eighty (180) degrees from one another. Preferably the angle α illustrated in FIG. 3 is twenty-two (22) degrees, thirty (30) minutes; equivalently the arc 100 from the center line of cylindrical coil form 47 to the center line of cylindrical coil form 49 is preferably one hundred fifty-seven (157) degrees, thirty (30) minutes.

The angle α is preferably twenty-two and one half (22½) degrees, because as will be explained below, for each three hundred sixty (360) degree rotation of disk 36, four pulses are generated through electromagnetic coupling of the vanes passing each of the coils 46 and 48. Thus, a ninety (90) mechanical degree rotation of the disk corresponds to a complete pulse cycle of three hundred sixty (360) electrical degrees. Thus, a physical angle α of twenty-two and one half (22½) mechanical degrees represents ninety (90) degrees in the electrical pulse cycle.

Turning again to FIG. 2, space 44 between the end of inner member 38 and the ends of the coils 46 and 48 is filled with kerosene or diesel oil. Thus the disk 36 rotates in a fluid filled space where the kerosene or diesel oil serves to lubricate bearings 54 and 56 and to prevent borehole fluid and contaminates which might possibly migrate past sealing members 101 and bearings 54 and 56 as illustrated in FIGS. 1 and 2 from contaminating the gap space 45 between disk 36 and the coils 46 and 48.

Turning now to FIG. 4, a block diagram illustration of the electronics for generating a fluid flow signal and a direction signal is presented. Coils 46 and 48 form part of the oscillator circuits 60 and 61 driven preferably at a one hundred (100) kilohertz rate. As the vanes of the disk pass the ends of the respective coils 46 and 48, the amplitude of the oscillation from the oscillator 60 and 61 are modulated. As illustrated for example in sketch 4A, the frequency of the modulation is proportional to the frequency of turning of the disk 36. As each vane of the disk passes the end of a particular coil, say 46 or 48, the impedance of the coil is changed due to eddy current induced in the metallic disk 36 which affects the electric or sensing field pattern generated by the solenoidal coil. As a result, the output of the oscillators vary in amplitude at a frequency proportional to the rate of turning of the disk 36 which is directly related to the rate of turning of impeller 28 through shaft 34 as illustrated in FIGS. 1 and 2.

Turning again to FIG. 4, demodulator circuits 64 and 65 strip the one hundred kilohertz oscillation from the oscillators 60 and 61 generating modulated signals as illustrated further in sketch 4B. The signal output from demodulator 64 is then applied respectively to low pass filter 66, amplifier 68 and pulse shaper 70 from the signal generating coil 46.

The output from demodulator 65 is applied to low pass filter 67, amplifier 69 and pulse shaper 72 in response to the signal generated in coil 48. As illustrated in sketch 4C, a pulse train is generated which is essentially a square wave pulse train. Either coil 46 or coil 48 may be taken as a reference coil, but for purposes of illustration, the output from pulse shaper 70 in response to the signal generated coil 46 may be taken as a reference pulse train.

Figure 6:
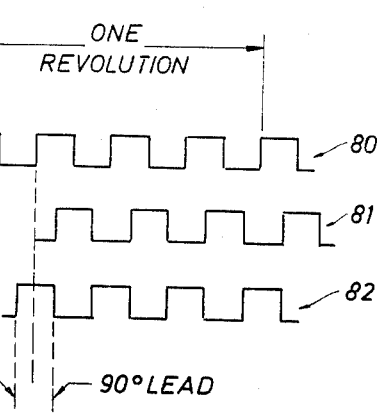
FIG. 6 illustrates pulse trains which result from the electrical circuitry in response to the turning of the vaned disk past solenoidal coils which drive the circuitry.

FIG. 6 illustrates that for one revolution of the disk 36, four complete square wave pulses are generated. Pulse train 80 is illustrated as that appearing on lead 73. Pulse train 81 of FIG. 6 illustrates that for a fluid flow in one direction turning the disk 36 in one direction, a signal on conductor 78 leads reference signal by ninety (90) electrical degrees is generated. Conversely, pulse train 82 is illustrated as being generated on lead 78 in response to the signal generated in coil 48 where the direction of rotation of disk 36 is opposite to that illustrated by pulse train 81. Pulse train 82 lags by ninety (90) electrical degrees the reference pulse train 80 on lead 75.

The pulse train 80 on lead 73 is applied via lead 90 to the data input of flip flop 76. The pulse train on lead 78 is applied to the clock input of flip flop 76. For a reference pulse train 80 as appearing on lead 90 to the data input of flip flop 76 and a leading pulse train 81 of FIG. 6 is applied to the clock input from lead 78, a continuous "Q" output of flip-flop 76 is generated indicating that the direction of rotation of the disk or fluid flow in the borehole is in a first direction (preferably upward). Conversely, when the disk 36 is rotating in the opposite direction in response to the opposite direction of fluid flow, the lagging pulse train 82, as illustrated in FIG. 6, is applied to the clock input of flip flop circuit 76 while the reference pulse train is applied to the data input of flip flop 76. On this occurrence, no continuous output is generated at the "Q" output of flip flop 76 and the signal on lead 77 does not appear which serves as an indicator that the fluid flow is in the opposite direction.

The rate of flow may be indicated by a signal generated by a counter 74 attached to either lead 73 or 78. For purposes of illustration, the reference pulse train on lead 73 is applied to a counter 74, the output of which on lead 75 indicates fluid flow rate.

Figure 5:
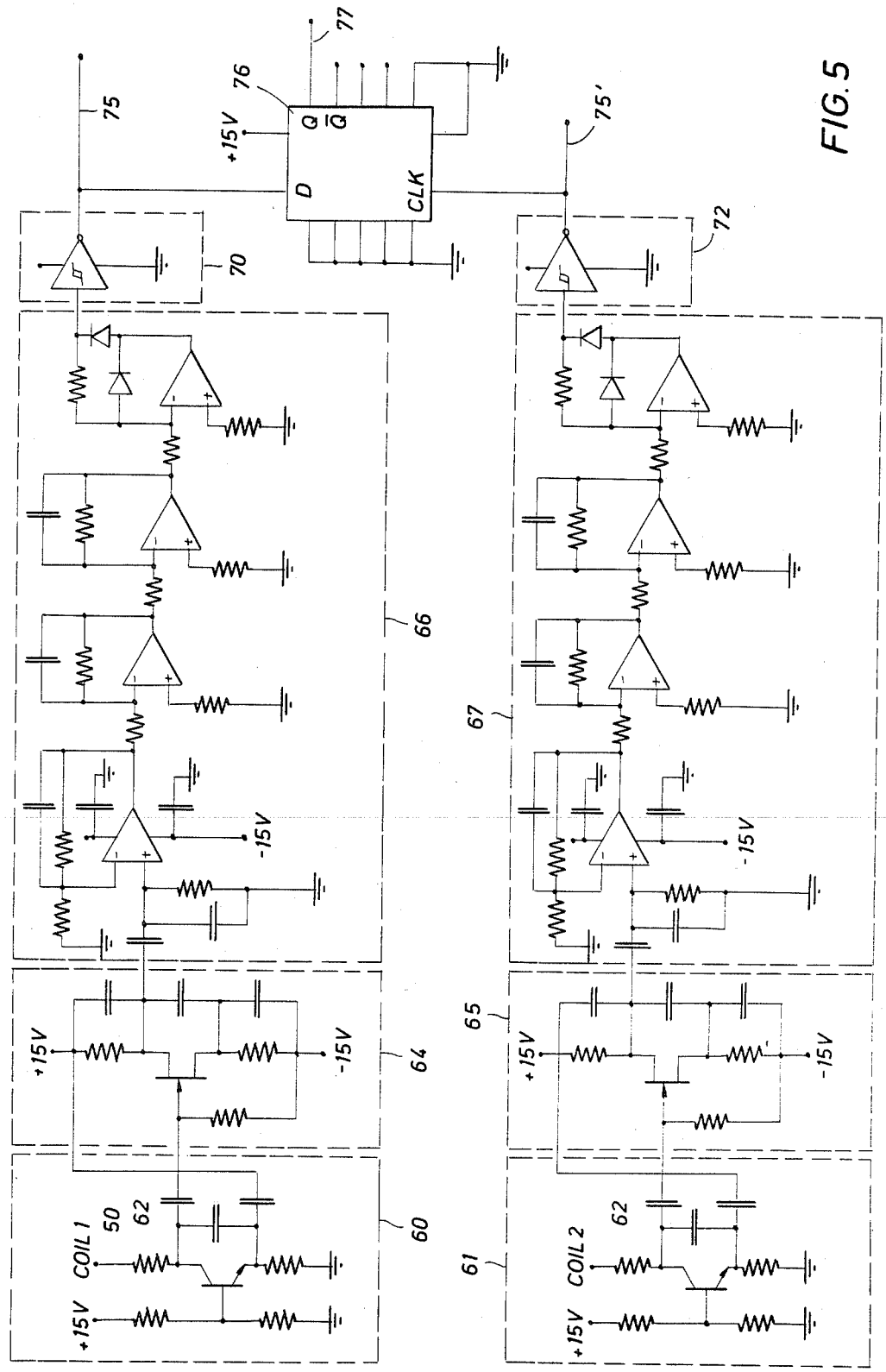
FIG. 5 illustrates electrical circuitry which may be provided in the block diagram of FIG. 4.

FIG. 5 illustrates the preferred circuitry for the various functional circuits illustrated in FIG. 4. The oscillators 60, 61, demodulators 64, 65, low pass filters and amplifiers 66 and 68, pulse shapers 70, 72 may advantageously be used, but any circuitry which performs the functions as illustrated in FIG. 4 may of course be used by one of ordinary skill in the electronic arts.

FIGS. 7 and 8 illustrate an alternative embodiment of the flow meter apparatus here designated by reference numeral 10'. In FIG. 7, the physical arrangement of the impeller 28 and vaned disk 43 in a mechanical embodiment in a body 32 is identical to that illustrated in FIG. 1B. In this alternative embodiment of the invention however, the solenoidal coils of FIGS. 1B and 2 are replaced by electromagnetic sensing means. In the preferred embodiment, the electromagnetic sensing means take the form of light emitting diode/detector pairs such as diode/detector pair 201, 202 and pair 203, 204. The pairs may sense radiation in the optical or the infrared range of the electromagnetic frequency spectrum. These pairs are oriented geometrically identically to the orientation of the solenoidal sensing means embodiment illustrated in FIGS. 1B and 2, that is, they are oriented approximately one hundred thirty seven and one half (137½) degrees about an arc about the axis of the flow metering apparatus.

The light emitting diode/detector pairs generate alternating signals in the detector when a vane of the vaned disk 43 (having its surface facing the diode/detector pair reflective), reflects light (or any electromagnetic radiation) emitted from the diode back to the detector and generates an output on the output lead of the detector. Preferably, the vaned disk is identical in all other respects, other than having its surface be reflective, to that of FIG. 1B or 2. The lenses 205 and 206 for diode/detector pair 201, 202 and the lenses 206 and 208 for the diode/detector pair 203, 204 serve to provide a path for the light or electromagnetic radiation from the diode to the reflective disk and back to the detector through a pressure bulkhead 210.

FIG. 8 illustrates the circuit means provided for generating a flow rate signal on lead 242 and a direction signal on lead 241. As illustrated, driver circuits 210, 211 serve to energize emitting diodes 201 and 203 to produce a light or electromagnetic radiation output which is directed via lenses 205 and 207 toward the vaned disk. When a disk is in the path of the light so generated, it is reflected respectively back to detectors 202 and 203. As the disk 43 turns in response to fluid flow against impeller 28, an alternating signal is produced on leads 214 and 215. The alternating signals produced on leads 214 and 215 are of course alternating at a frequency proportional to the rate of turning of the impeller 28 in response borehole fluid flow. After amplification and shaping by circuits 220, 230 and 221, 231, the signals are applied to flip flop circuit 240. Since the alternating signals on leads 232 and 233 are out of phase with one another by ninety (90) degrees because of the geometrical orientation of the diode/detector pairs 201, 202 and 203, 204 similar to the geometrical orientation of the solenoidal coils illustrated by FIG. 3, the output on lead 241 of flip flop circuit 240 produces a signal indicative of the direction of fluid flow against impeller 28.

A fluid flow rate signal is produced by counting the number of oscillations of the alternating signal on lead 233 or alternatively on lead 232 over a predetermined time period in order to generate a fluid flow rate signal on lead 242.

Various modifications and alterations in the described structures and circuits will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. Wellbore fluid flow measuring apparatus comprising,
    an elongated body adapted for passage through a wellbore and having a given portion through which wellbore fluids may pass,
    a disk comprising at least three substantially flat vanes rotatably mounted in said body in a plane perpendicular to the axis of the body and in isolation from said borehole fluid,
    non-magnetic means for turning said disk in proportion to the rate of fluid flow through said given body portion,
    sensing means in isolation from said borehole fluids, comprising two spaced apart detectors disposed in close proximity to the surface of said disk for respectively generating for each detector a pulse train signal indicative of the disk's turning rate,
    the spacing of the detectors relative to the axis of the body and the width and number of the vanes being selected so as to generate a phase difference of about ninety degrees between the two pulse train signals in response to the rotation of the disk, and
means for communicating said pulse train signals to the surface.

2. The wellbore fluid flow measuring apparatus of claim 1 wherein the sensing means further includes means for combining said pulse train signals for generating a signal indicative of disk rotation direction.

3. The wellbore fluid flow measuring apparatus of claim 2 wherein said disk is provided with four vanes mounted in said body in a plane perpendicular to the axis of the body member,
said detectors comprise two coils respectively, the impedance of each of the coils being varied at a rate in proportion to the rate of turning of said disk,
circuit means operably connected to said two coils for generating two alternating signals, the frequency of each of said signals being essentially identical but having leading or lagging phases with respect to each other depending on the direction of rotation of said disk, and
logic circuit means responsive to said two alternating signals for generating a signal indicative of the direction of fluid flow through the borehole.

4. The borehole fluid flow measuring apparatus of claim 2 wherein said disk comprises four substantially flat vanes mounted in said body in a plane perpendicular to the axis of the body member,
said sensing means having at least two light emitting diode/detector pairs operably disposed opposite the plane of said vanes, whereby an optical path of each of the diode/detector pairs is completed at a rate proportional to the rate of turning of said disk,
circuit means operably connected to said detectors of said diode/detector pairs for generating two alternating signals, the frequency of each of said signals having essentially identical frequencies but having leading or lagging phases with respect to each other depending on the direction of rotation of said disk, and
logic circuit means responsive to said two alternating signals for generating a signal indicative of the direction and rate of fluid flow through said given body portion.

5. The wellbore fluid flow measuring apparatus of claim 1 further comprising means for energizing said detectors in a manner that minimizes the loading effect on said disk due to operation of said energizing means.

6. The borehole fluid flow measuring apparatus of claim 1 wherein said detectors comprise light emitting diodes operably disposed so that an optical path between each diode and its corresponding detector is alternatively established and interrupted responsive to the rotation of the disk.

7. Borehole fluid flow measuring apparatus comprising,
an elongated body sized for passage through a fluid-filled borehole,
a flat disk comprising at least three vanes rotatably mounted inside said body in isolation of borehole fluids and defining a disk plane perpendicular to the axis of elongation of the body,
non-magnetic means for turning said disk in proportion to the speed and direction of fluid flow through a given portion of said body,
two spaced apart detectors mounted inside said body, and having detection sensitive surfaces facing the disk plane across a gap,
means for energizing said detection sensitive surfaces in a manner that minimizes the loading effect on said disk due to operation of said energizing means,
first and second circuit means connected respectively to said two detectors, whereby the turning of the vanes of said vaned disk past said detection sensitive surfaces of said detectors causes said respective circuit means to vary the frequency of an output pulse train having a fifty percent duty cycle,
the spacing of the detectors relative to the axis of the body and the number and respective width of the vanes being selected so as to generate a phase difference of about ninety degrees between the two pulse trains generated in response to the rotation of the disk, and
third circuit means responsive to the output of said first and second circuit means for generating signals indicative of disk rotation rate and direction.

8. The apparatus of claim 7 wherein the turning means comprises:
a longitudinal shaft rotatably mounted inside said body, said disk being fastened at an end of said shaft,
an impeller fastened at the other end of said shaft within said given portion of said body, and
means for directing borehole fluid flow against said impeller in order to turn said impeller.

9. The apparatus of claim 8 wherein said directing means comprises
a petal basket attached to said body and extending radially outwardly, and
slots in said body member open to the borehole fluid, said slots being located both above and below the point of attachment of said basket to said body and defining therebetween said given portion of said body.

10. The apparatus of claim 7 wherein:
said disk has four vanes each perpendicular to its adjacent vanes and the detection sensitive surfaces of the two detectors are spaced approximately one hundred fifty seven degrees, thirty minutes (157-30') radially from each other about the axis of the body.

11. The apparatus of claim 7 wherein said detection sensitive surfaces are sensitive to the incidence of light.

12. The apparatus of claim 7 wherein said vanes are made of a metal and said detection sensitive surfaces are sensitive to the passage of a metallic object in proximity thereto.

* * * * *